United States Patent
Cai et al.

(10) Patent No.: US 7,286,730 B2
(45) Date of Patent: Oct. 23, 2007

(54) OPTICAL SWITCH HAVING ANGLE TUNING ELEMENTS AND MULTIPLE-FIBER COLLIMATORS

(75) Inventors: Ming Cai, Fremont, CA (US); Xuehua Wu, Union City, CA (US); Giovanni Barbarossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 11/376,051

(22) Filed: Mar. 15, 2006

(65) Prior Publication Data
US 2007/0217735 A1    Sep. 20, 2007

(51) Int. Cl.
*G02B 6/42* (2006.01)
(52) U.S. Cl. ....................................................... 385/16
(58) Field of Classification Search .................... 385/16
See application file for complete search history.

(56) References Cited
U.S. PATENT DOCUMENTS

| | | | |
|---|---|---|---|
| 4,244,045 A * | 1/1981 | Nosu et al. ................ 398/86 |
| 5,647,033 A * | 7/1997 | Laughlin ..................... 385/16 |
| 6,009,219 A * | 12/1999 | Doyle ......................... 385/23 |
| 6,253,007 B1 * | 6/2001 | Laughlin ..................... 385/34 |
| 6,597,829 B2 * | 7/2003 | Cormack ..................... 385/22 |
| 2003/0043471 A1* | 3/2003 | Belser et al. ............... 359/634 |
| 2004/0263990 A1* | 12/2004 | Hsieh ......................... 359/634 |
| 2005/0036202 A1* | 2/2005 | Cohen et al. ............... 359/495 |
| 2006/0008238 A1* | 1/2006 | Suzuki et al. ............... 385/147 |
| 2006/0197013 A1* | 9/2006 | Liebman et al. ............ 250/234 |

* cited by examiner

*Primary Examiner*—Ellen Kim
(74) *Attorney, Agent, or Firm*—Patterson & Sheridan, LLP

(57) ABSTRACT

An optical switch with a compact form factor includes a multiple-fiber collimator and an angle tuning element for deflecting an optical beam from an input fiber into one of at least two output fibers. The angle tuning element may be provided between a pair of coaxially-aligned collimators, one of which is the multiple-fiber collimator. Alternatively, the angle tuning element may be provided between the multiple-fiber collimator and a reflective surface, so that only one collimator is required and the optical switch may be designed to have its input and output ports on the same side.

6 Claims, 12 Drawing Sheets

OPTICAL SWITCH HAVING ANGLE TUNING ELEMENTS AND MULTIPLE-FIBER COLLIMATORS

BACKGROUND OF THE INVENTION

1. Field of the Invention

The present invention relates generally to an optical switch, and more specifically to an optical switch with angle tuning elements and multiple-fiber collimators that perform optical signal switching between input and output optical pathways.

2. Description of the Related Art

Optical switches are widely deployed in optical networks to provide functions such as light path routing, protection switching, and system performance monitoring. The switching function is generally achieved by mechanically moving fiber or other bulk optic elements using stepper motors, controlled actuators or electrical relays. Various examples of optical switches are disclosed in U.S. patent application Ser. No. 11/070,450, entitled "Optical Switch," filed Mar. 1, 2005, the entire contents of which are incorporated herein by reference.

The form factor of an optical switch is an important design consideration. Compact form factors are often desirable and are required in increasing number of applications, but invariably there exist practical limits on how much a design can be miniaturized.

SUMMARY OF THE INVENTION

The present invention provides various configurations for an optical switch that allow the optical switch to be designed with smaller form factors. The present invention incorporates multiple-fiber collimators with angle tuning elements into an optical switch in innovative ways to reduce the form factor and also to reduce costs and improve the stability and performance reliability of the optical switch design.

According to an embodiment of the present invention, the optical switch includes a pair of collimators that are aligned with an optical axis of the optical switch, and an angle tuning element between the two collimators for deflecting an optical beam output from one collimator into the other collimator. One or both of the collimators may have multiple fibers. When only one of the collimators has multiple fibers, the optical switch is capable of 1×N switching, where N is an integer equal to 2 or more. When both collimators have multiple fibers, the optical switch is capable of M×N switching, where both M and N are integers equal to 2 or more.

According to another embodiment of the present invention, the optical switch includes a collimator that has both input and output fibers integrated therein and a reflective element for reflecting an optical beam output from the collimator. An angle tuning element is provided in the optical beam path for coupling the optical beam into one of the output fibers of the collimator. The angle tuning element may be positioned in the optical beam path before or after the optical beam is reflected. Alternatively, the angle tuning element may be configured with a reflective surface to function as both a reflective element and a beam deflecting element.

The present invention also provides various configurations for an angle tuning element that are usable in an optical switch. Each of these configurations has two sections, e.g., upper and lower sections, for deflecting optical beams. The upper section deflects optical beams in a downward direction by an angle and the lower section deflects optical beams in an upward direction by an angle. A symmetrical configuration may be provided in which case the angle of deflection in either case is the same.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention incorporates multiple-fiber collimators, also referred to as multiple-port collimators, with angle tuning elements into an optical switch in innovative ways to reduce the form factor and also to reduce costs and improve the stability and performance reliability of the optical switch design.

The optical switch according to the embodiments of the present application may be used in various industrial applications, e.g., to provide selectable fiber routing, protection switching, system performance monitoring, etc.

Figure 1:
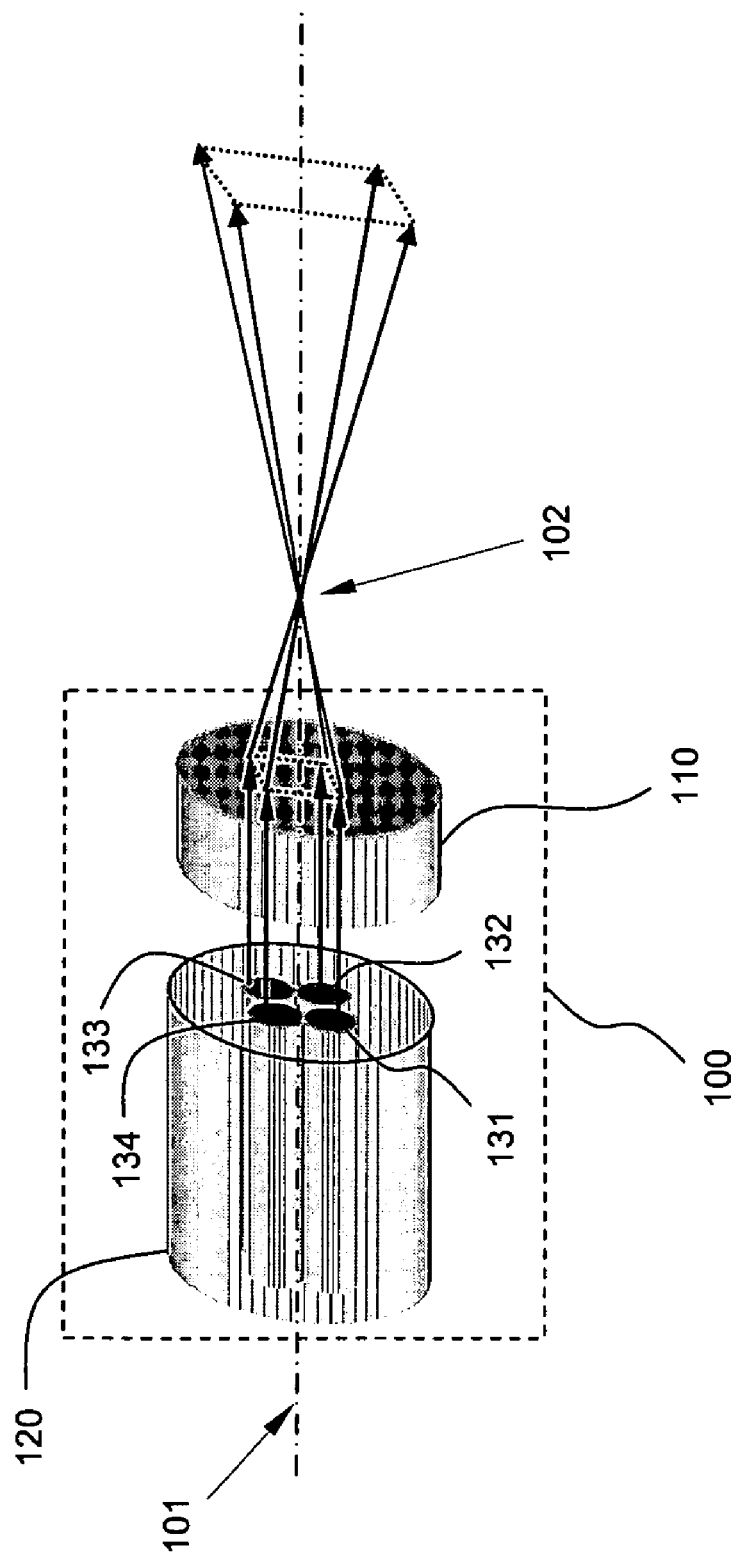
FIG. 1 is a schematic illustration of one type of a multiple-fiber collimator that is used in various embodiments of the present invention.

FIG. 1 is a schematic illustration of a multiple-fiber collimator 100 that is used in various embodiments of the present invention. The multiple-fiber collimator 100 has an optical axis 101 along which a collimating lens 110 and a multiple-fiber pigtail 120 are aligned. The multiple-fiber pigtail 120 has four optical fibers 131, 132, 133, 134 embedded in its body. The optical fibers 131, 132, 133, 134 extend axially through the body of the multiple-fiber pigtail 120 and are parallel to one another. Optical beams transmitted through the multiple-fiber collimator 100 cross at a point 102 that is in close proximity to the collimating lens 110 and then diverge at angles defined by the geometry of the multiple-fiber pigtail 120 and the focal length of the collimating lens 110. The centers of the collimating lens 110 and the multiple-fiber pigtail 120 are aligned along the optical axis 101 of the multiple-fiber collimator 100. Additional details of multiple-fiber collimators and the method of manufacturing them are disclosed in U.S. Pat. No. 6,454,465, entitled "Method of Making an Optical Fiber Collimating Device," and U.S. Pat. No. 6,767,139, entitled "Six-Port Optical Package and Method of Manufacturing." The entire contents of both of these patents are incorporated by reference herein.

An optical switch according to various embodiments of the present invention uses the multiple-fiber collimator 100 in combination with an angle tuning element that has a unique design. This unique design of the angle tuning element is based on a single-piece (monolithic) optical crystal. The crystal can be considered as a multiplexer of several simple prisms and/or mirrors. It deflects an optical beam into different directions or turns multiple beams into their designated directions respectively. Other types of angle tuning elements may be used with the present invention. In general, it may be any element that is capable of deflecting an optical beam by an angle, e.g., a mirror, an optical prism, a multiplexed prism, and the like.

Figure 2:
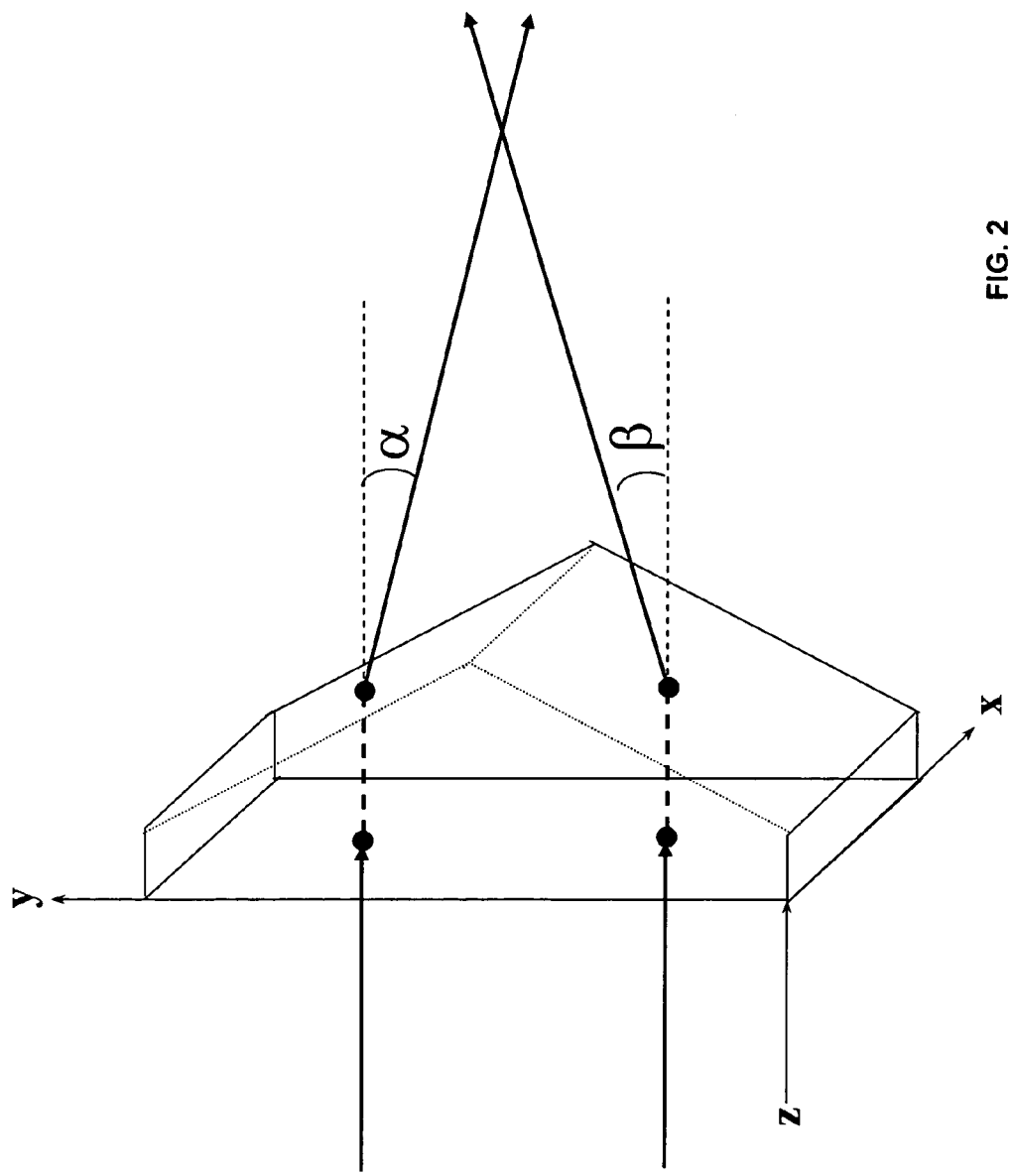
FIG. 2 is an enlarged view of a prism that is used in various embodiments of the present invention.
Figure 3:
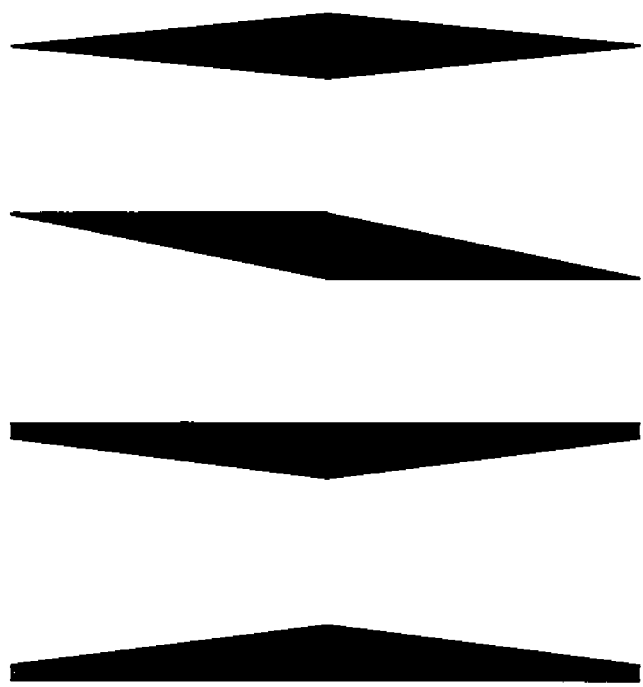
FIG. 3 illustrates alternative prism configurations that may be employed in an optical switch according to various embodiments of the present invention.

One example of the angle tuning element used in various embodiments of the present invention is a duplex prism or a roof prism, illustrated in FIG. 2. If an optical beam arrives at the upper surface of this prism, the prism will deflect the optical beam downwards by an angle α. If an optical beam arrives at the lower surface of this prism, the prism will deflect the optical beam upwards by an angle β. The angles α and β can be designed to be the same or different angles depending on the application. If the angles α and β are equal, the prism is considered to be symmetrical. FIG. 3 illustrates alternative configurations of a duplex or roof prism.

Figure 4A:
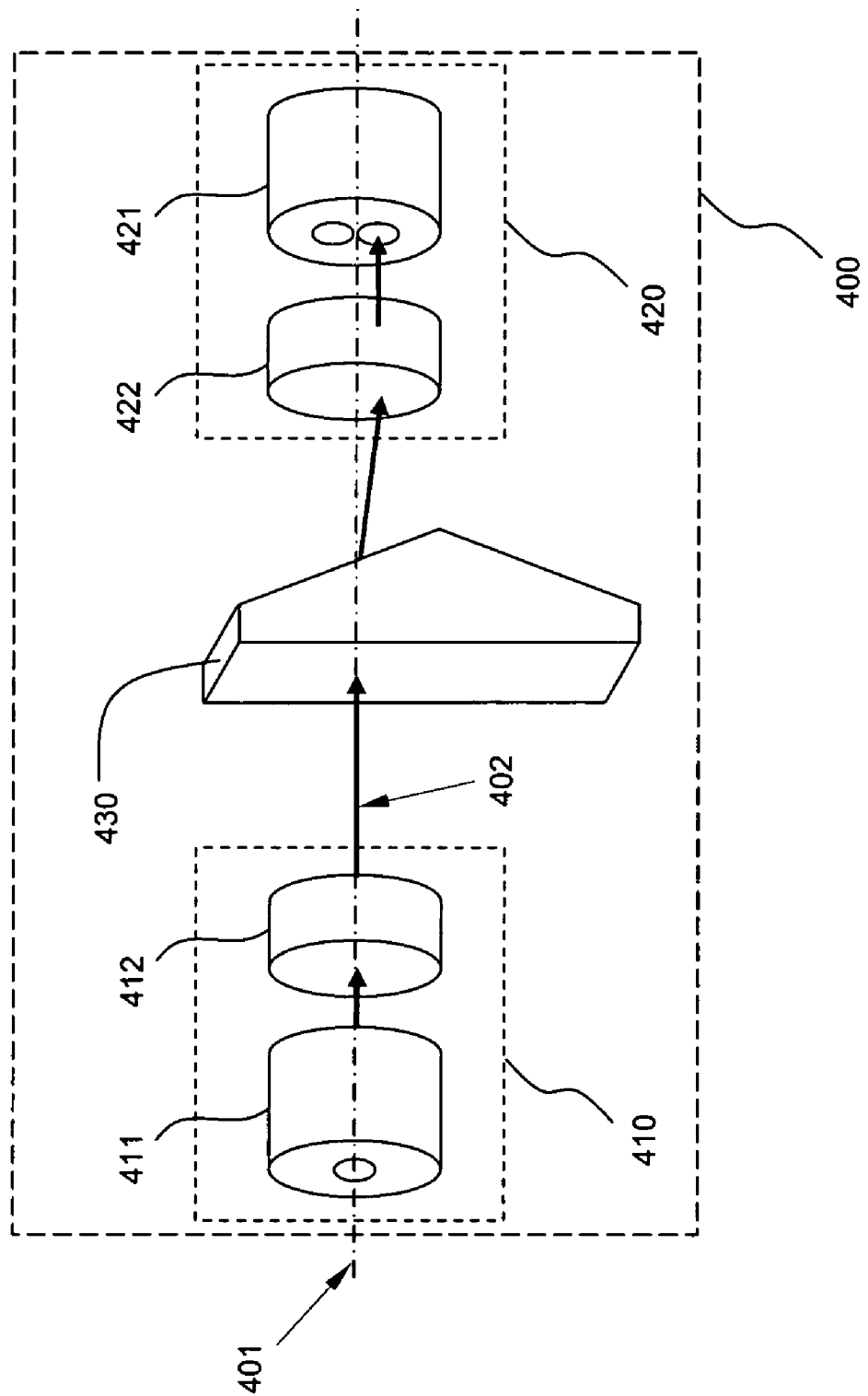
FIGS. 4A and 4B illustrate two modes of operation of a 1×2 optical switch according to an embodiment of the present invention.
Figure 4B:
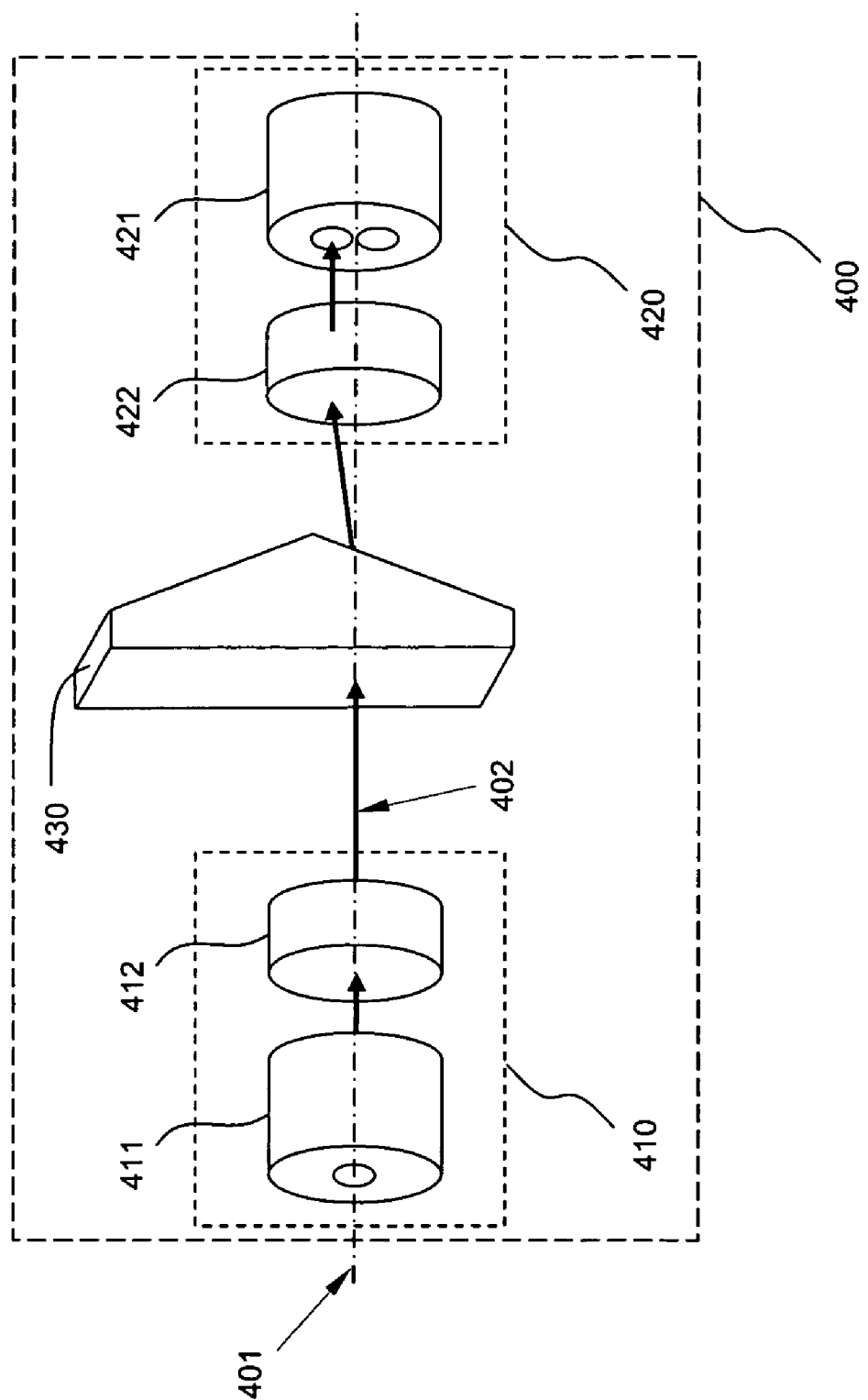

FIGS. 4A and 4B illustrate a 1×2 optical switch 400 according to an embodiment of the present invention. The optical switch 400 includes an input collimator 410, an output collimator 420, and a roof prism 430 functioning as an angle tuning element. The input collimator 410 is a single-fiber collimator and includes a pigtail section 411 and a collimating lens 412. The output collimator 420 is a dual-fiber collimator and includes a pigtail section 421 and a collimating lens 422. The input collimator 410 and the output collimator 420 are coaxially arranged along the optical axis 401 of the optical switch 400. The roof prism 430 is movable into two positions by an actuator mechanism (not shown), which may be any conventional actuator, including a mechanical actuator, electromechanical actuator, magnetic actuator, piezoelectric actuator, and the like.

FIG. 4A illustrates the optical switch 400 operating in a first mode. In the first mode, the roof prism 430 is actuated into a down position so that an optical beam transmitted through the input collimator 410 is deflected by the upper part of the roof prism 430 into one of the two fibers embedded in the pigtail section 421. FIG. 4B illustrates the optical switch 400 operating in a second mode. In the second mode, the roof prism 430 is actuated into an up position so that an optical beam transmitted through the input collimator 410 is deflected by the lower part of the roof prism 430 into the other fiber embedded in the pigtail section 421.

Figure 5A:
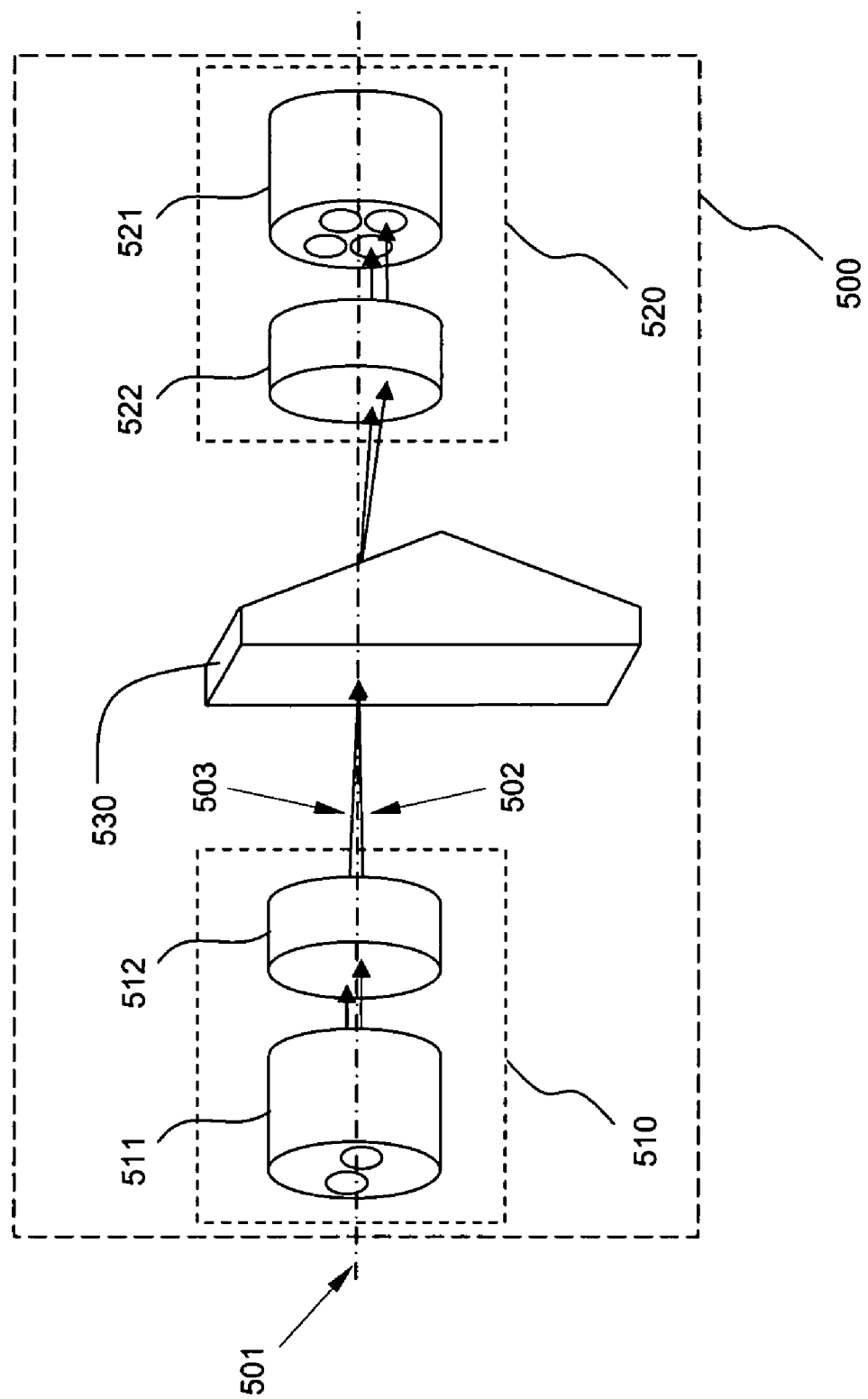
FIGS. 5A and 5B illustrate two modes of operation of a 2×4 optical switch according to an embodiment of the present invention.
Figure 5B:
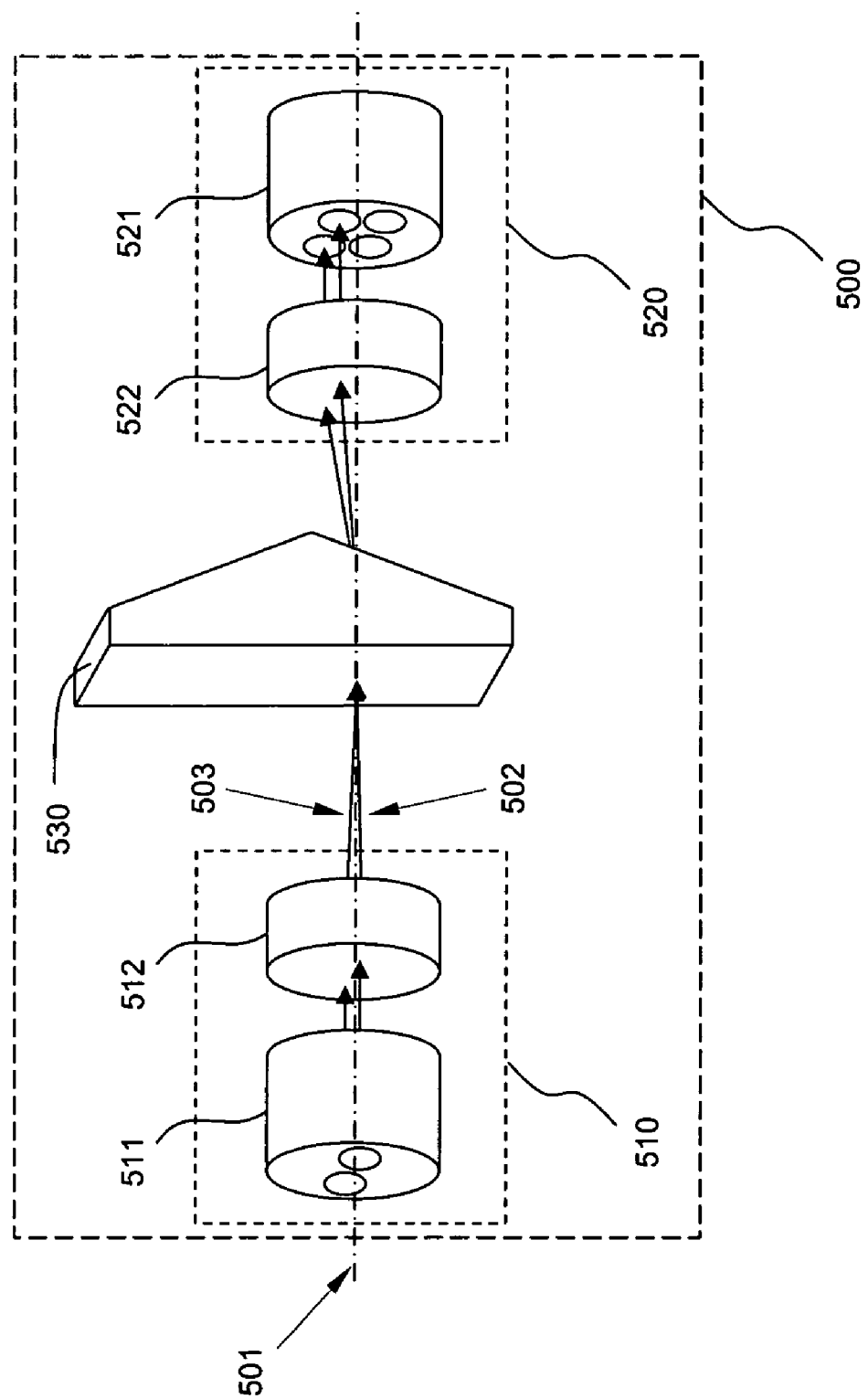

FIGS. 5A and 5B illustrate a 2×4 optical switch 500 according to an embodiment of the present invention. The optical switch 500 includes an input collimator 510, an output collimator 520, and a roof prism 530 functioning as an angle tuning element. The input collimator 510 is a dual-fiber collimator and includes a pigtail section 511 and a collimating lens 512. The output collimator 520 is a four-fiber collimator and includes a pigtail section 521 and a collimating lens 522. The input collimator 510 and the output collimator 520 are coaxially arranged along the optical axis 501 of the optical switch 500. The roof prism 530 is movable into two positions by an actuator mechanism (not shown), which may be any conventional actuator, including a mechanical actuator, electromechanical actuator, magnetic actuator, piezoelectric actuator, and the like.

FIG. 5A illustrates the optical switch 500 operating in a first mode. In the first mode, the roof prism 530 is actuated into a down position so that the optical beams 502, 503 transmitted through the input collimator 510 are deflected by the upper part of the roof prism 530 into two of the four fibers embedded in the pigtail section 521. FIG. 5B illustrates the optical switch 500 operating in a second mode. In the second mode, the roof prism 530 is actuated into an up position so that the optical beams 502, 503 transmitted through the input collimator 510 are deflected by the lower part of the roof prism 530 into the other two fibers embedded in the pigtail section 521.

Embodiments of the optical switch illustrated in FIGS. 5A, 5B, 6A and 6B incorporates the highly integrated multiple-port, multiple-fiber collimators with multiplexed angle tuning elements so that they are coaxially arranged along the optical axis of the optical switch. As a result, an ultra compact opto-mechanical structure that is much more simple and stable relative to the prior art designs is provided.

Figure 6A:
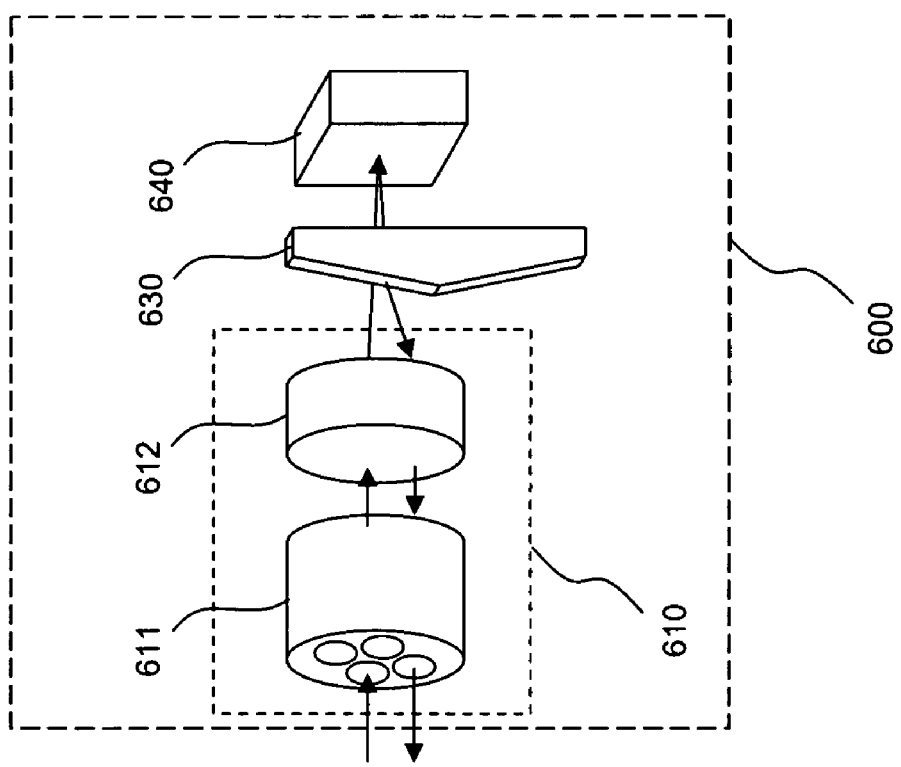
FIGS. 6A and 6B illustrate two modes of operation of a 1×2 optical switch according to another embodiment of the present invention.
Figure 6B:
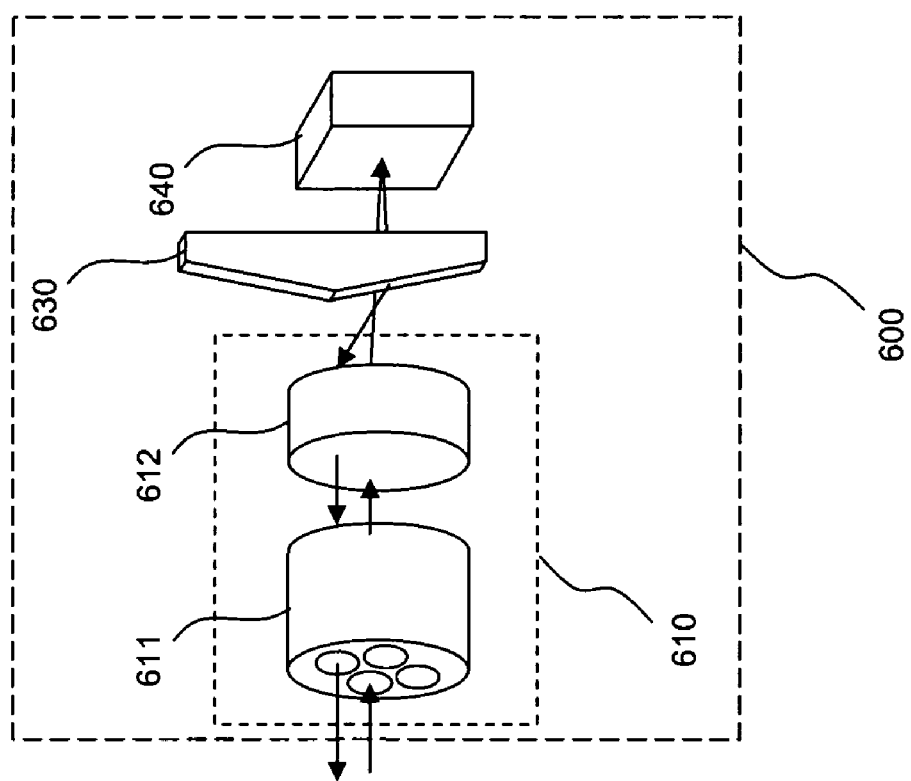

FIGS. 6A and 6B illustrate a 1×2 optical switch according to another embodiment of the present invention. In this embodiment, input and output ports of the optical switch 600 are provided on the same side of the optical switch 600. By having all input/output ports at the same side of the optical switch 600, a more compact form factor can be achieved and fiber management becomes less difficult. This design also provides improved stability and performance reliability because it uses less components.

A three-fiber collimator can serve as the input/output ports of a 1×2 optical switch, but in the optical switch 600, a four-fiber collimator 610 is provided because it is manufactured in higher volumes and is thus more readily available. The four-fiber collimator 610 includes a pigtail section 611 and a collimating lens 612. The optical switch 600 further includes a roof prism 630 and a mirror 640. The roof prism 630 is positioned in the path of the optical beam reflected by the mirror 640, but not in the path of the optical beam between the output of the collimator 610 and the mirror 640. In an alternative embodiment, the roof prism 630 may be positioned in the path of the optical beam between the output of the collimator 610 and the mirror 640, but not in the path of the optical beam reflected by the mirror 640. In either case, the roof prism 630 is movable into two positions by an actuator mechanism (not shown), which may be any conventional actuator, including a mechanical actuator, electromechanical actuator, magnetic actuator, piezoelectric actuator, and the like.

FIG. 6A illustrates the optical switch 600 operating in a first mode. In the first mode, the roof prism 630 is actuated into a down position so that the optical beam transmitted through a first one of fibers of the four-fiber collimator 610 and the collimating lens 612 and reflected by the mirror 640 is deflected by the upper part of the roof prism 630 into a second one of the four fibers embedded in the pigtail section 611. FIG. 6B illustrates the optical switch 600 operating in a second mode. In the second mode, the roof prism 630 is actuated into an up position so that the optical beam transmitted through a first one of fibers of the four-fiber collimator 610 and the collimating lens 612 and reflected by the mirror 640 is deflected by the lower part of the roof prism 630 into a third one of the four fibers embedded in the pigtail section 611. A fourth one of the four fibers embedded in the pigtail section 611 is not used.

Figure 7A:
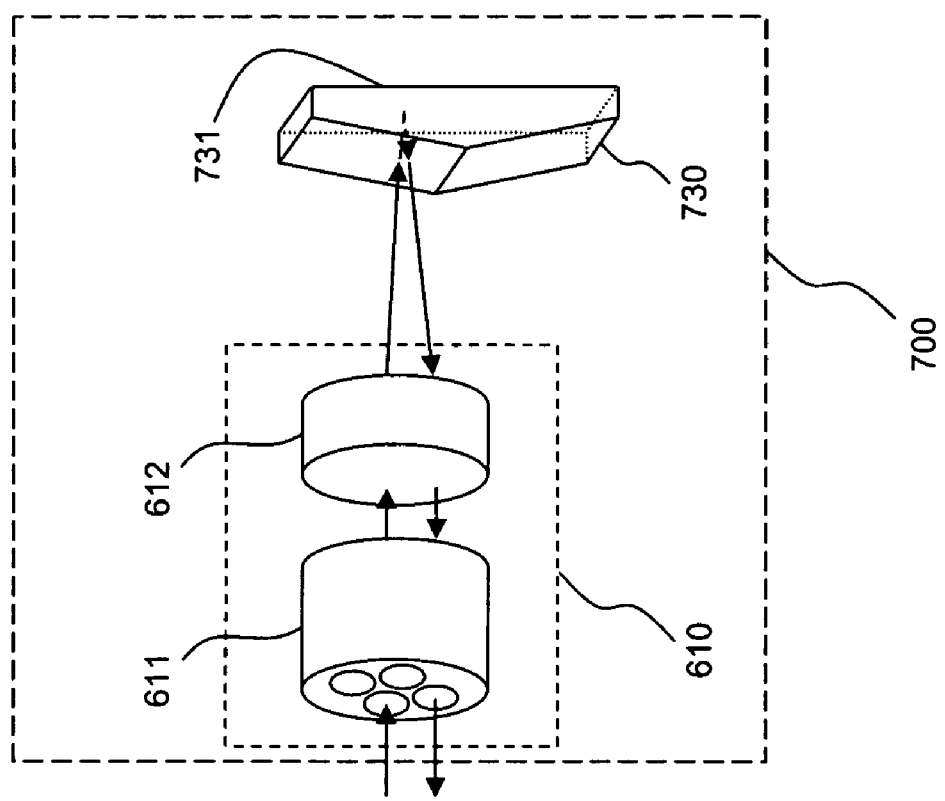
FIGS. 7A and 7B illustrate two modes of operation of a 1×2 optical switch according to another embodiment of the present invention.
Figure 7B:
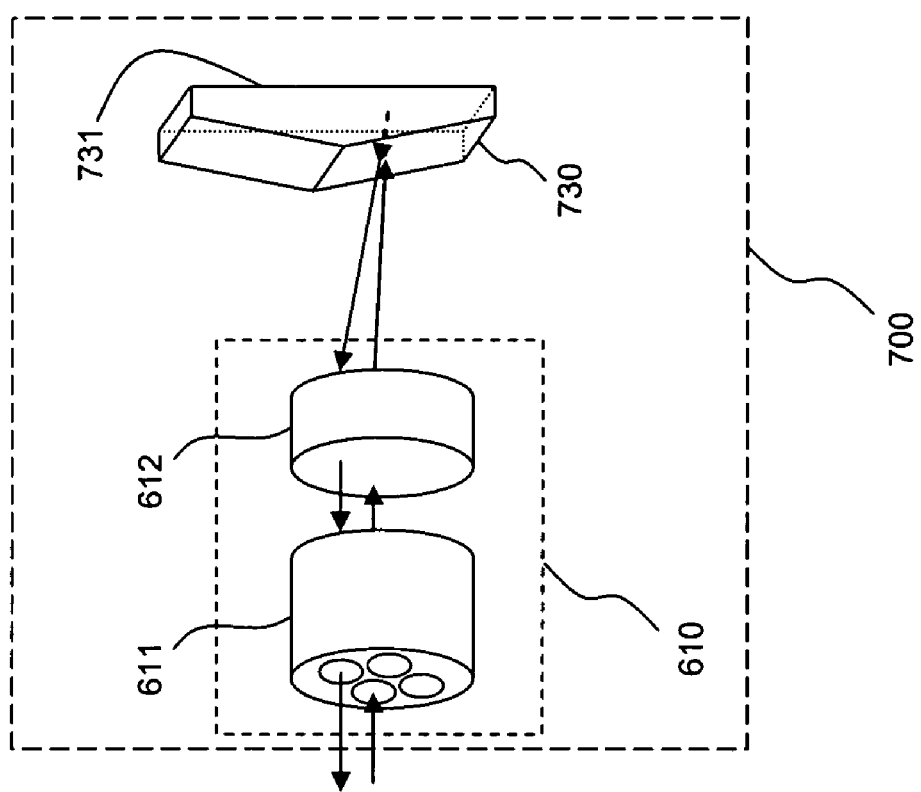

The roof prism 630 and the mirror 640 can be replaced by a monolithic optical element 730, as shown in FIGS. 7A and 7B. The monolithic optical element 730 has a roof prism substrate with the two front angular surfaces having anti-reflective coating and the rear surface 731 having a high-reflective coating.

FIG. 7A illustrates the optical switch 700 operating in a first mode. In the first mode, the monolithic optical element 730 is actuated into a down position so that the optical beam transmitted through a first one of fibers of the four-fiber collimator 610 and the collimating lens 612 is transmitted through the front upper surface of the monolithic optical element 730 and reflected by the rear surface of the monolithic optical element 730. The reflected optical beam is then deflected by the upper part of the monolithic optical element 730 into a second one of the four fibers embedded in the pigtail section 611. FIG. 7B illustrates the optical switch 600 operating in a second mode. In the second mode, the monolithic optical element 730 is actuated into an up position so that the optical beam transmitted through a first one of fibers of the four-fiber collimator 610 and the collimating lens 612 is transmitted through the front lower surface of the monolithic optical element 730 and reflected by the rear surface of the monolithic optical element 730. The reflected optical beam is then deflected by the lower part of the monolithic optical element 730 into a third one of the four fibers embedded in the pigtail section 611. As before, a fourth one of the four fibers embedded in the pigtail section 611 is not used.

Figure 8:
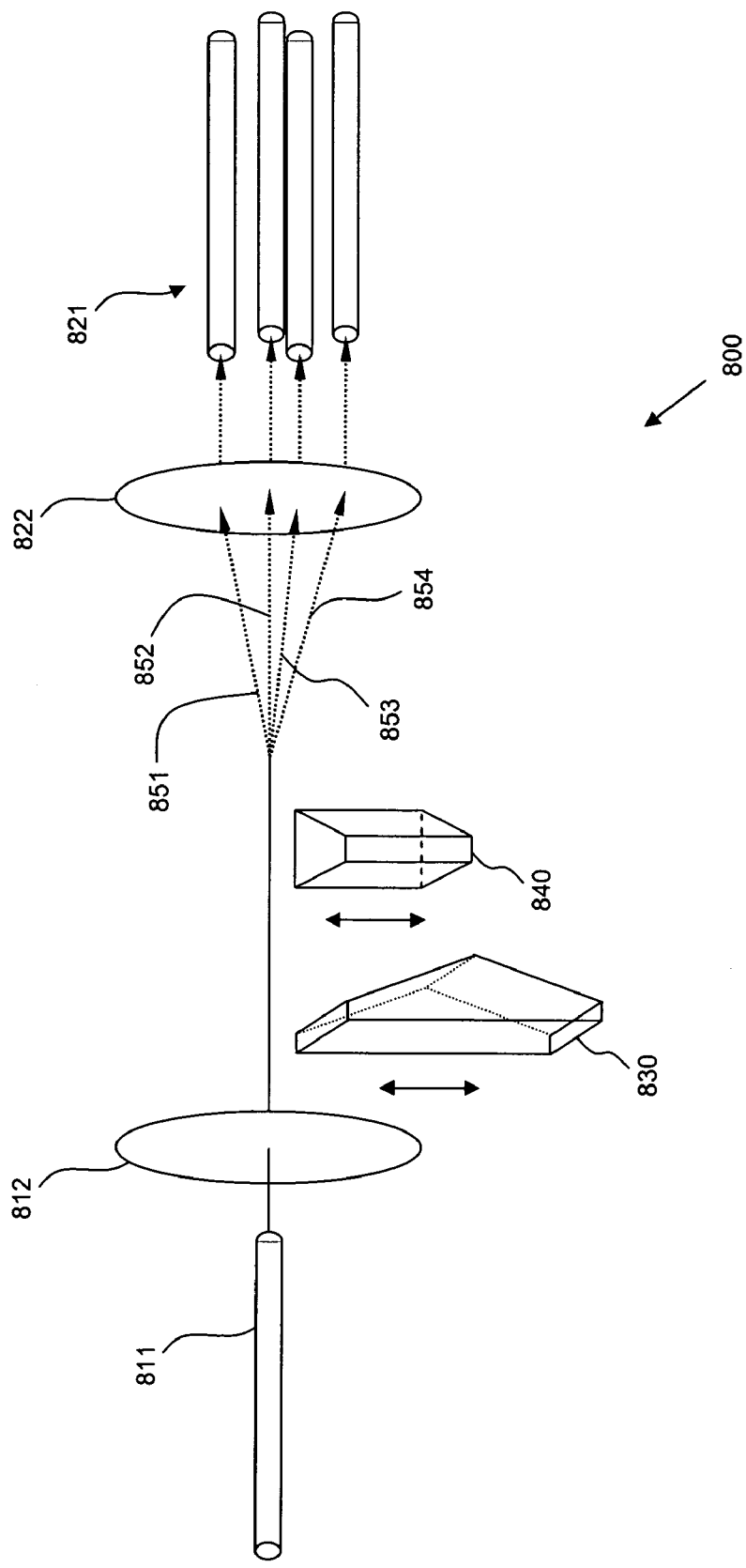
FIG. 8 illustrates various components used in a 1×4 optical switch according to an embodiment of the present invention.

FIG. 8 is a schematic illustration of a 1×4 optical switch 800 according to an embodiment of the present invention. The optical switch 800 includes an input collimator including an input fiber 811 and an input collimating lens 812, an output collimator including a set of output fibers 821 and an output collimating lens 822, and a pair of prisms 830, 840. The prisms 830, 840 provide two stages of angle tuning. In the first stage, the prism 830 deflects the optical beam upwards or downwards by an angle depending on its position. In the second stage, the prism 840, depending on its position, may further deflect the optical beam that has been deflected by the prism 830.

A set of four deflected optical beams 851, 852, 853, 854 are shown in FIG. 8. The optical beam 851 represents an optical beam that is deflected upwards by the prism 830 and then further deflected by the prism 840. The optical beam 852 represents an optical beam that is deflected upwards by the prism 830 and not further deflected by the prism 840. The optical beam 853 represents an optical beam that is deflected downwards by the prism 830 and then further deflected by the prism 840. The optical beam 854 represents an optical beam that is deflected downwards by the prism 830 and not further deflected by the prism 840.

The prisms 830, 840 are moved by an actuator mechanism (not shown), which may be any conventional actuator, including a mechanical actuator, electromechanical actuator, magnetic actuator, piezoelectric actuator, and the like. The prism 830 is movable into an up position where it deflects the incoming optical beam upwards and a down position where it deflects the incoming optical beam downwards. The prism 840 is also movable into two positions. In the first position, the prism 840 is in the path of the optical beam deflected by the prism 830. In the second position, the prism 840 is moved completely out of the path of the optical beam deflected by the prism 830.

While the foregoing is directed to embodiments of the present invention, other and further embodiments of the invention may be devised without departing from the basic scope thereof. The scope of the present invention is determined by the claims that follow.

What is claimed is:

1. An optical switch comprising:
   a first collimator having a center axis aligned with an optical axis of the optical switch;
   a second collimator having a center axis aligned with the optical axis of the optical switch; and
   an angle tuning element between the first and second collimators for deflecting an optical beam output from the first collimator into the second collimator, wherein the angle tuning element is movable between a first position, where a first section of the angle tuning element deflects the optical beam into a first path, and a second position, where a second section of the angle tuning element deflects the optical beam into a second path, and wherein at least one of the first and second collimators is a multiple-fiber collimator.

2. The optical switch according to claim 1, wherein the second collimator comprises at least two ports, a first fiber corresponding to a first one of the at least two ports, and a second fiber corresponding to a second one of the at least two ports, and wherein the optical beam, when deflected into the first path, couples into the first fiber, and the optical beam, when deflected into the second path, couples into the second fiber.

3. The optical switch according to claim 1, wherein the first and second sections of the angle tuning element are configured to deflect the optical beam in different directions but by substantially the same angle.

4. The optical switch according to claim 1, wherein the angle tuning element deflects another optical beam output from the first collimator into the second collimator.

5. The optical switch according to claim 1, wherein the first and second collimators have a different number of ports.

6. The optical switch according to claim 1, wherein the angle tuning element is movable between the first position and the second position in a linear manner.

* * * * *